United States Patent

Mizuno

Patent Number: 5,904,891
Date of Patent: May 18, 1999

[54] DISK PRODUCING METHOD FOR PHOTO FILM CASSETTE

[75] Inventor: Kazunori Mizuno, Kanagawa, Japan

[73] Assignee: Fuji Photo Film Co., Ltd., Kanagawa, Japan

[21] Appl. No.: 08/954,079

[22] Filed: Oct. 20, 1997

Related U.S. Application Data

[63] Continuation of application No. 08/542,911, Oct. 13, 1995, abandoned.

[30] Foreign Application Priority Data

Oct. 17, 1994 [JP] Japan .................................. 6-250979

[51] Int. Cl.$^6$ ............................. B29C 51/02; B29C 51/44
[52] U.S. Cl. ........................ 264/544; 264/153; 264/156; 264/553; 425/302.1
[58] Field of Search .................................... 264/553, 153, 264/156, 551; 425/295, 302.1

[56] References Cited

U.S. PATENT DOCUMENTS

| | | | |
|---|---|---|---|
| 3,466,355 | 9/1969 | Kostur | 264/551 |
| 3,484,518 | 12/1969 | Ignell | 425/295 |
| 3,740,922 | 6/1973 | Kienzler et al. | 72/361 |
| 3,861,261 | 1/1975 | Maxey | 83/387 |
| 4,423,943 | 1/1984 | Gold . | |
| 4,666,394 | 5/1987 | Wakamiya et al. | 264/551 |
| 4,834,306 | 5/1989 | Robertson et al. . | |
| 4,844,852 | 7/1989 | Keyser et al. | 264/153 |
| 4,848,693 | 7/1989 | Robertson . | |
| 5,111,723 | 5/1992 | Andrusch et al. | 83/24 |
| 5,211,348 | 5/1993 | Enomoto . | |
| 5,271,577 | 12/1993 | Takahashi et al. . | |
| 5,322,649 | 6/1994 | Rheinish et al. | 264/153 |
| 5,407,146 | 4/1995 | Takahashi et al. . | |
| 5,409,368 | 4/1995 | Heiskell et al. | 264/153 |
| 5,437,828 | 8/1995 | Shimizu et al. | 264/153 |
| 5,582,086 | 12/1996 | Kogame | 264/153 |

FOREIGN PATENT DOCUMENTS

| | | |
|---|---|---|
| 61-51570 | 3/1986 | Japan . |
| 63-196850 | 8/1988 | Japan . |

*Primary Examiner*—Jan H. Silbaugh
*Assistant Examiner*—Mark Eashoo
*Attorney, Agent, or Firm*—Sughrue, Mion, Zinn, Macpeak & Seas, PLLC

[57] ABSTRACT

A photo film cassette includes a spool core (4), on which the photo film is wound in a form of roll. A cassette shell (2a, 2b) contain the spool core in rotatable fashion. First and second disks (6a, 6b) are respectively provided with bearing holes (5) formed in a middle thereof, and respectively secured to ends of the spool core, for regulating positions of sides of the roll. A ring-like lip (11) is formed integrally with a periphery of the first disk, projected toward the roll, contacted on one edge of an outermost turn of the roll, and prevents the roll from being loosened. In a disk producing method, a sheet (21) of thermoplastic resin is heated and softened. Pressurization and/or suction is applied to the heated sheet to fit the sheet on a mold (23d), so as to form a pattern (19, 31, 58, 60) on the sheet. The pattern includes first and second groups of disk-like portions (19) and positioning portions (31, 58, 60) associated with the disk-like portions. The disk-like portions of the first group are cut out of the sheet with the pattern while the sheet is positioned by the positioning portions, to produce the first disk. The disk-like portions of the second group are cut out of the sheet with the pattern while the sheet is positioned by the positioning portions, to produce more of the first disk.

8 Claims, 17 Drawing Sheets

F I G. 3A
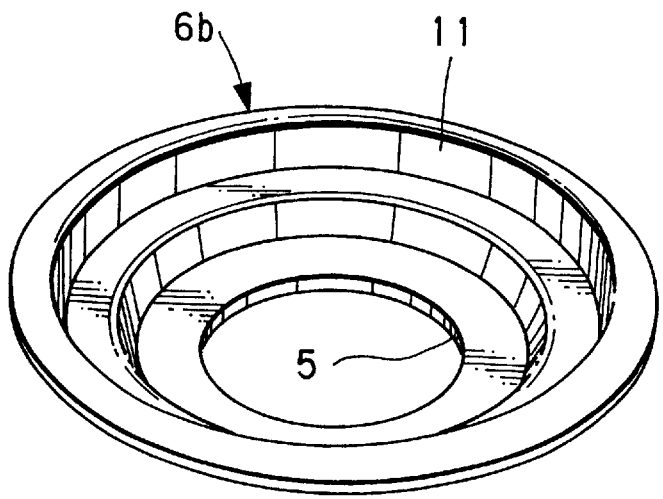
F I G. 3B
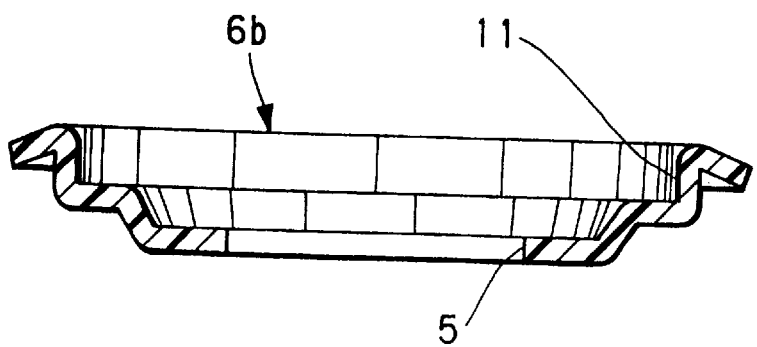

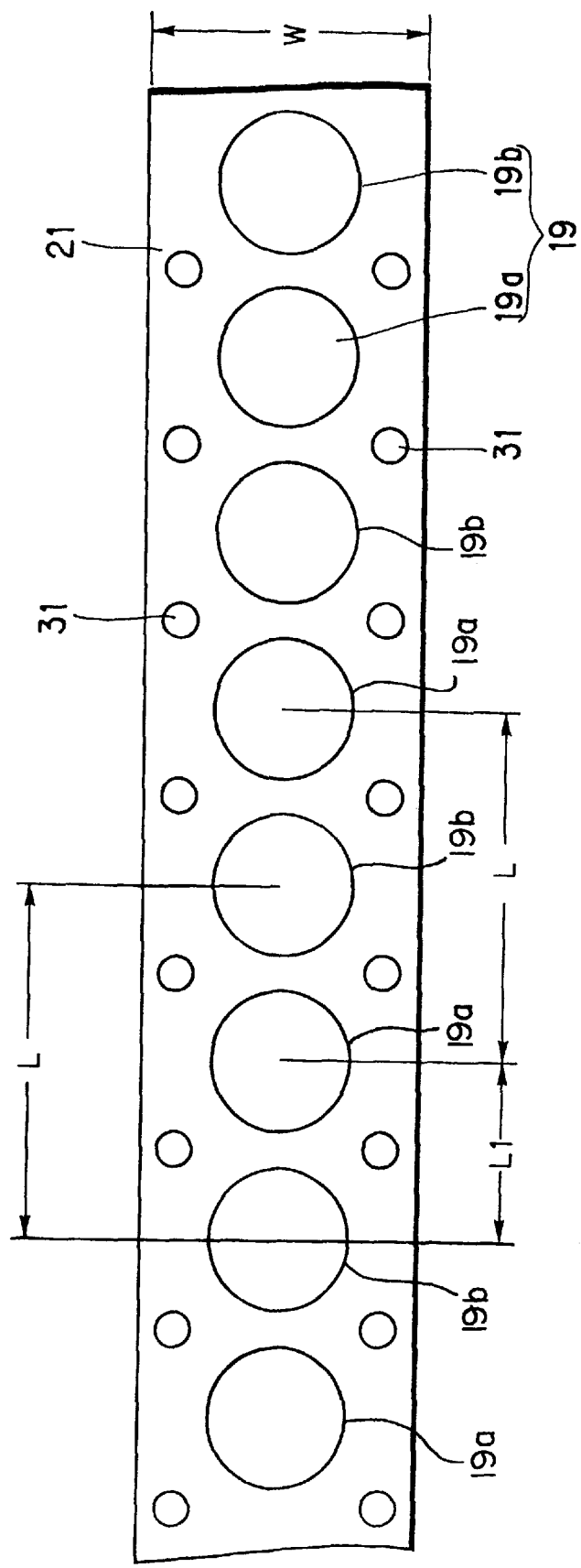

F I G. 10
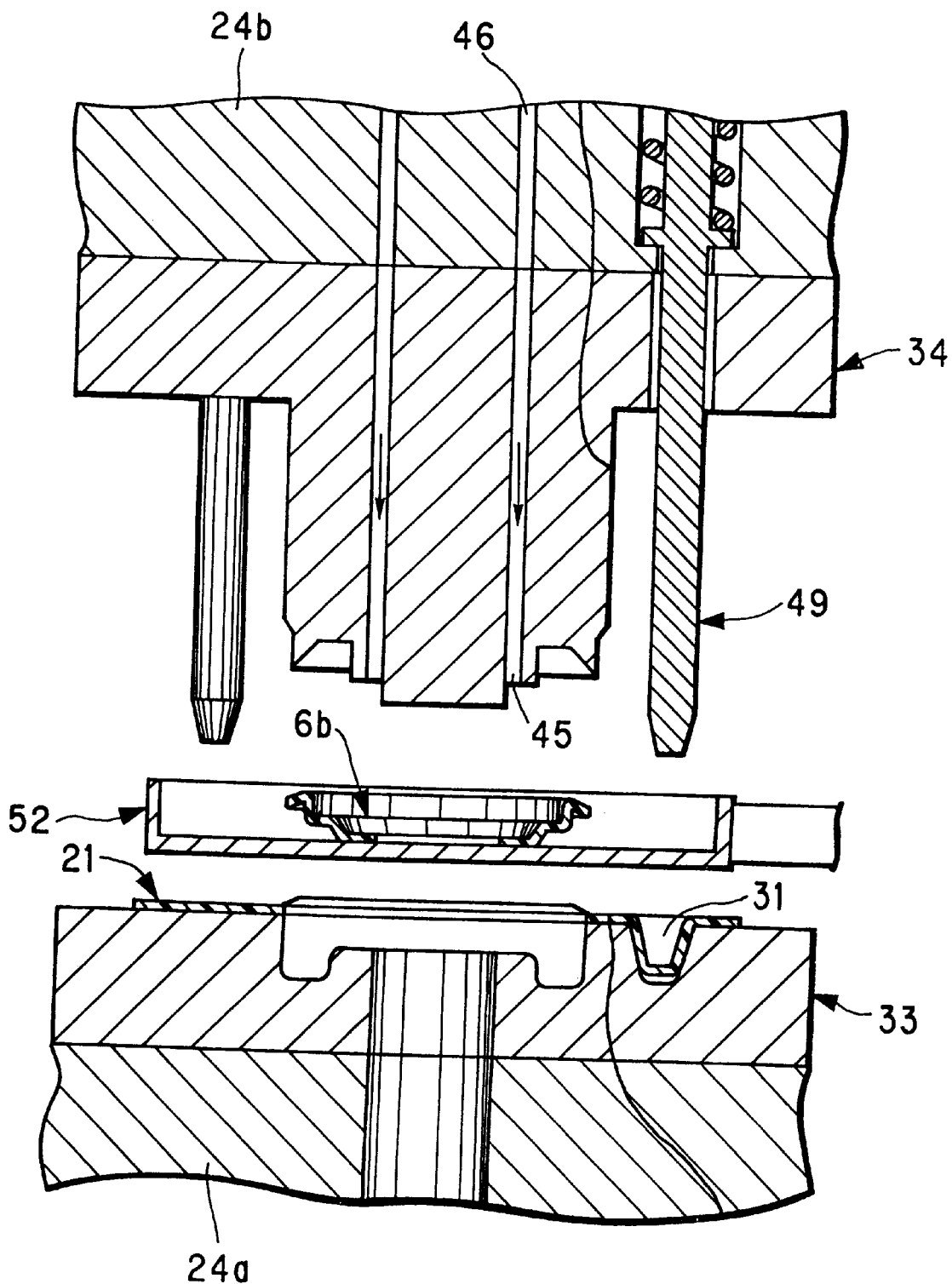

DISK PRODUCING METHOD FOR PHOTO FILM CASSETTE

This is a continuation of application Ser. No. 08/542,911 filed Oct. 13, 1995, now abandoned.

BACKGROUND OF THE INVENTION

1. Field of the Invention

The present invention relates to a disk producing method for a photo film cassette. More particularly, the present invention relates to a method of producing a plastic disk with high quality to be used in a photo film cassette, of which a leader of the photo film is exited by rotation of a spool in an unwinding direction.

2. Description Related to the Prior Art

U.S. Pat. No. 4,423,943 discloses a type of photo film cassette, of which a leader of unexposed photo film is pre-contained in the cassette shell, and advanced to an outside of the cassette shell when a spool is rotated in an unwinding direction. The spool is constituted by a spool core and two disks, which are disposed on the spool core, for contact with the ends of a roll of the photo film, to render the turns of the photo film neat. In the cassette of the leader-advancing type, it is necessary to transmit rotation of the spool to the roll of the photo film. To this end, the disks of the spool are provided with respective ring-like lips formed on their periphery and projected toward one another. The ring-like lips are located to cover edges of the outermost turn of the photo film, and prevent the roll from being loosened. Such a cassette is suggested in U.S. Pat. Nos. 4,834,306, 4,848,693 (corresponding to JP-A 2-18545), U.S. Pat. No. 5,271,577 (corresponding to JP-A 3-37645), and U.S. Pat. No. 5,407,146 (corresponding to JP-A 3-37645).

To advance the leader of the photo film, it is necessary to spread both disks in the vicinity of a photo film passageway, to release the ring-like lips from regulation. The disks are rotatable, and because they are thin, are usually deformed when they are rotated.

There is a suggestion of a forming method in U.S. Pat. No. 5,211,348 (corresponding to JP-A 4-251841 and 5-119436). A thin, continuous thermoplastic resin sheet is heated. The continuous sheet is deformed in accordance with vacuum forming. The continuous sheet is moved into a punch/die set, where a punch device and a die device cut a circular contour and a bearing hole at each disk-like portion, to form the disks. This known method has an effect of producing a thin disk with high efficiency.

To raise productivity, multiple disks should be cut out at one time precisely. It is important for disks to have precision in size of both its contour and its bearing hole. If a bearing hole of a disk is off-centered with respect to the contour, the disk, when contained in a cassette, cannot resist rotating in eccentric fashion about a spool core. It is then likely that the photo film leader will not advance to the outside, the disk receives excessive load and is broken, and is contacted on the disk contacts the cassette shell and is resistant to advancement of the leader.

It is also important in the disk producing method to set the position of the sheet in effecting the cutting precisely the same as the position in having effected the vacuum forming. If a bearing hole of a disk is off-centered with respect to an inner face of the ring-like lip, there may occur breakage of the disk, and high resistance to advancement of the leader. To overcome such difficulties, there is a suggestion in JP-A 61-51570: positioning holes are formed in the sheet at first. Regulating pins are inserted in the positioning hole to position the sheet, while the sheet is treated in the pressing forming, which is followed by a punching step.

In the disk production method discussed above, it is difficult to remove the punched piece from the sheet. There is a suggestion of a so-called "push-back method" in JP-A 63-196850, in which a punched piece is moved back into a punch hole formed in the sheet, which is transported to next station, where the punched piece is removed from the sheet.

A problem in the method of U.S. Pat. No. 5,211,348 (corresponding to JP-A 4-251841 and 5-119436) lies in low productivity of disks from a sheet. It is general in consideration of productivity that multiple disks should be treated at the same time both during the vacuum forming and during the punching. However a base plate at the base of a punch device should have a larger size than the punch device to keep precision in the punching. Hence, the interval between two adjacent punch devices can only be reduced by a certain amount. There is also a problem with cost. Resin for the disks which has high rigidity, high resistance to heat, and high resistance to flexural fatigue is somewhat expensive. Due to these factors, it is difficult to make a disk less expensive without increasing the productivity of the disc manufacture.

The method of JP-A 61-51570 also has shortcomings. The positioning holes operate to position the sheet in unchangeable fashion irrespective of the pressing forming. There may occur distortion in size of the sheet due to the pressing. The punching may be effected without consideration of the distortion. Punched pieces are likely to have various dimensions.

In the "push-back method" of JP-A 63-196850, it is difficult in stably retaining a thin piece inside the punch hole in the sheet. Punched pieces may be dropped from the sheet during the transport toward the removing station. Another problem is derived from the ring-like shape of the disk with a bearing hole. In particular is difficult or laborious to separate a scrap portion at the bearing hole from a ring-like piece of disk.

SUMMARY OF THE INVENTION

In view of the foregoing problems, an object of the present invention is to provide a disk producing method for a photo film cassette, with which disks can be produced in heightened productivity.

Another object of the present invention is to provide a disk producing method for a photo film cassette, in which disks can be produced with easiness both in the precise forming and in the disk removal.

In order to achieve the above and other objects and advantages of this invention, a photo film cassette includes a spool core, on which the photo film is wound in a form of roll. A cassette shell contains the spool core in rotatable fashion. First and second disks are respectively provided with first and second bearing holes formed in a middle thereof, and are respectively secured to first and second ends of the spool core, to regulate positions of the sides of the roll. A ring-like lip is formed integrally with a periphery of the first disk, projected toward the roll, contacted on one edge of an outermost turn of the roll, and prevents the roll from being loosened. In a disk producing method, a sheet of thermoplastic resin is heated and softened. Pressurization and/or suction of the sheet heated is effected, for fitting the sheet on a mold, so as to form a pattern on the sheet. The pattern includes first and second groups of disk-like portions and positioning portions associated with the disk-like portions. The disk-like portions of the first group are cut out of the sheet with the pattern while the sheet is positioned at the positioning portions, to produce the first disk. The disk-like portions of the second group are cut out of the sheet with the pattern while the sheet is positioned at the positioning portions, to produce the first disk.

For higher productivity, plural disks can be reliably treated during the punching, as a minimum of an interval between adjacent two of the punch devices can be set even smaller. This is advantage remarkably in view of somewhat expensive resin for the disk.

The sheet can be positioned in unchangeable fashion irrespective of the forming operation. Punched pieces can have one commonly determined dimension.

In the cutting steps of the first and second groups, a regulating device accesses the sheet, and is fitted on the positioning portions to position the sheet. The positioning portions are formed on the sheet in retraction away from the regulating device, and have an inclined face inclined away from the regulating device. Otherwise, the positioning portions are formed on the sheet in protrusion toward the regulating device, and have an inclined face inclined toward the regulating device.

In each of the cutting steps of the first and second groups, a contour of the first disk and the first bearing hole in a middle of the disk-like portions are cut, with a punch device and a die device substantially in simultaneous fashion. Suction is effected through a first air path, for exiting scrap portions created in cutting the first bearing hole. The first air path is formed in a middle of the punch device or the die device. Suction is effected through a second air path formed in the punch device or the die device, for retaining the first disk on the punch device or the die device, to separate the first disk from the sheet. The first disk is then removed from the punch device or the die device.

No difficulty lies in separating a scrap portion at the bearing hole from a ring-like piece of disk.

BRIEF DESCRIPTION OF THE DRAWINGS

The above objects and advantages of the present invention will become more apparent from the following detailed description when read in connection with the accompanying drawings, in which:

FIGS. 3A and 3B are respectively a perspective view and a cross section, illustrating a disk used with a spool core in the cassette;

FIG. 6 is an explanatory view in plan, illustrating arrangement of disk-like portions on the continuous sheet;

FIG. 10 is a cross section illustrating the first punching unit during the removal of the disk;

DETAILED DESCRIPTION OF THE PREFERRED EMBODIMENT(S) OF THE PRESENT INVENTION

Figure 1:
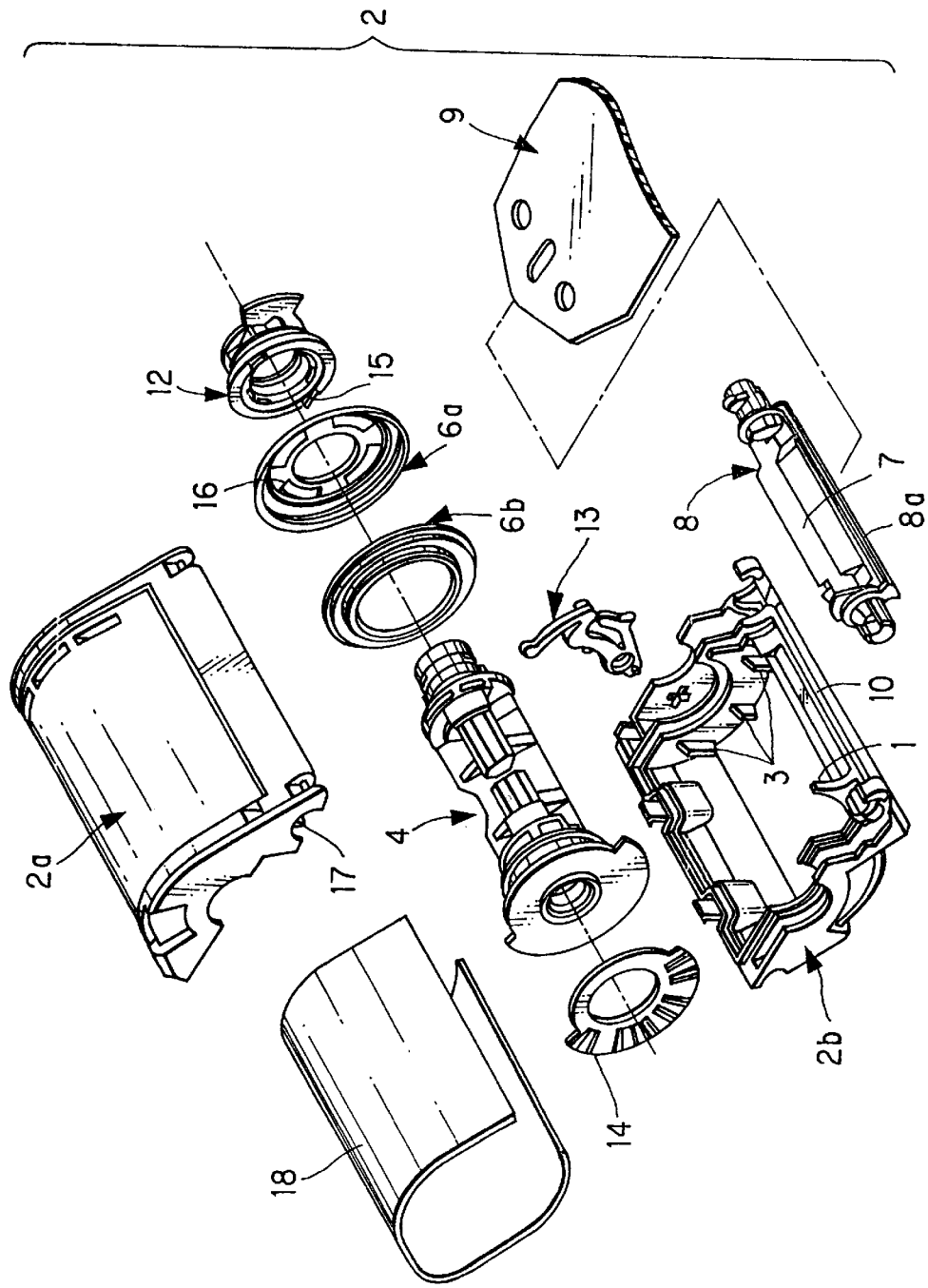
FIG. 1 is an exploded perspective view illustrating a photo film cassette.
Figure 2:
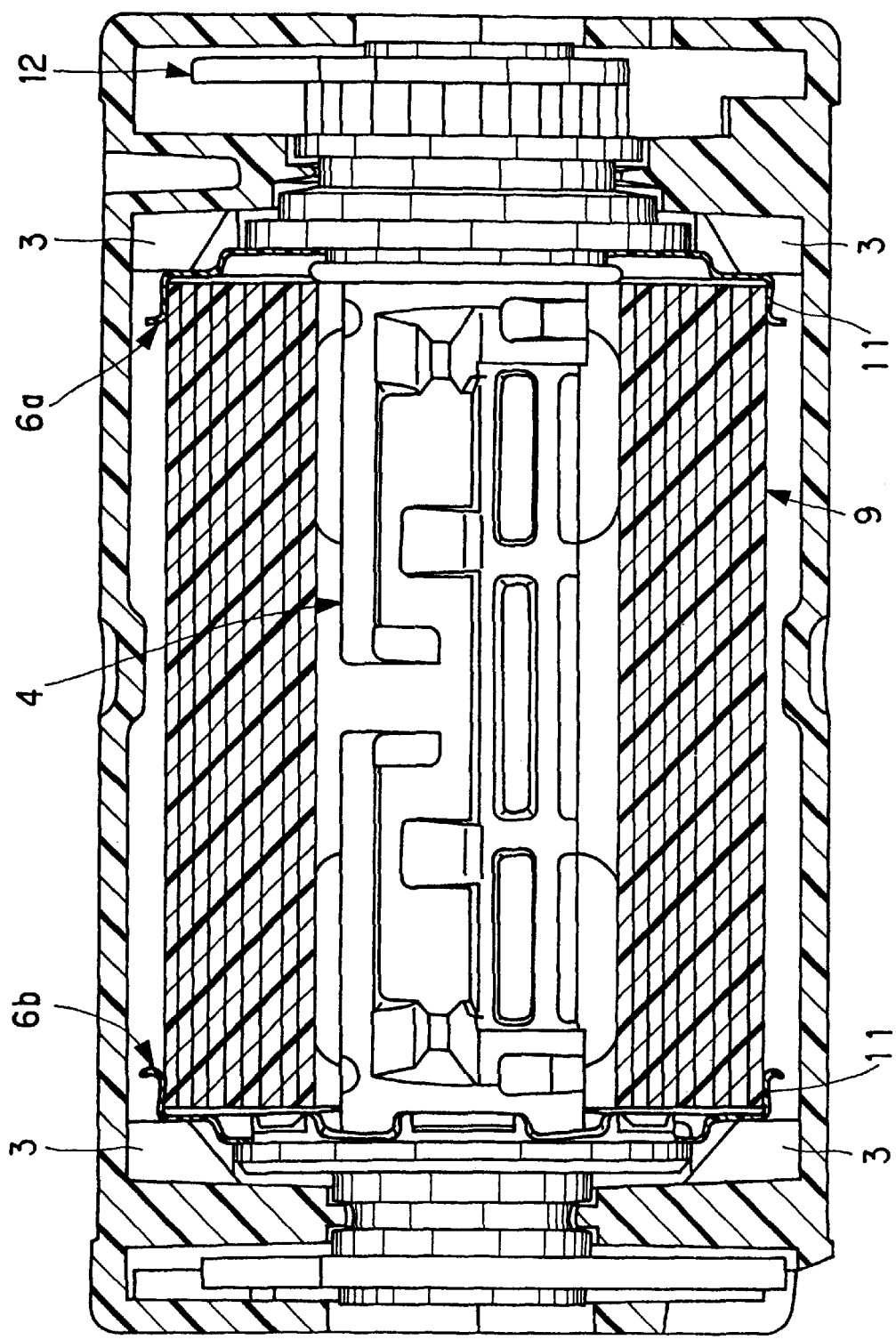
FIG. 2 is a horizontal section illustrating the cassette.

In FIGS. 1 and 2, a photo film cassette 2 includes plastic upper and lower shell halves 2a and 2b, a spool core 4, a shutter member 8, and a spool lock 13. The spool core 4 is contained inside the shell halves 2a and 2b in rotatable fashion.

The shell halves 2a and 2b respectively have a semicylindrical shape. The shell halves 2a and 2b are fitted together after the shutter member 8 is mounted in a photo film passage port 10. A photo film path 7 is formed in the passage port 10 for passage of a photo film 9. When the photo film 9 is entirely contained in the cassette shell, the shutter member 8 is closed. A lock 17 is engaged with the shutter member 8 to lock the shutter member 8. A photo film separator claw 1 is formed on the lower shell half 2b in an innermost position of the photo film path 7. The separator claw 1 operates to guide a leading end of the photo film 9 about the spool core 4, to direct it toward the photo film path 7.

The spool core 4 is inserted into disks 6a and 6b, which are secured to the spool core 4 in rotatable fashion. As a barrel member 12 for indication of degree of use is secured to the spool core 4, a clutch claw 15 is inserted into a slot-like retaining opening 16 formed in the disk 6a. When the spool core 4 is rotated in an unwinding direction, the clutch claw 15 is retained on the retaining opening 16, to cause the disk 6a to rotate forcibly. When the spool core 4 is rotated in a winding direction, the clutch claw 15 is free from the retaining opening 16, to allow the disk 6a to rotate.

The inside of the shell halves 2a and 2b is provided with ridges 3 for avoiding disengagement of the disks 6a and 6b. There are a data disk sticker 14 attached to an end face of the spool core 4, and an outer sticker 18 attached outside the cassette. The data disk sticker 14 is rotatable to render film type information accessible to a reader device of a camera. The sticker 18 indicates the photo film type, the cassette serial number and the like. It is preferred that the stickers 14 and 18 are formed from material the same as the cassette.

As illustrated in FIGS. 3A and 3B, the disk 6b is formed of plastics thinly, and provided with flexibility. In the middle of the disk 6b is formed a bearing hole 5 for insertion of the spool core 4. The periphery of the disk 6b has a ring-like lip 11. When the spool core 4 is rotated in the unwinding direction, the ring-like lips 11 cover ends of the outermost turns of the photo film roll, transmit rotation of the spool core 4 to the photo film 9, and keep the photo film 9 from being loosened. Note that the disk 6b has a diameter of 20 mm.

As illustrated in FIG. 1, the shutter member 8 has a light-shielding plate 8a at its center. The shutter member 8 is shiftable between a closed position and an open position. In the closed position, the light-shielding plate 8a blocks the photo film path 7. In the open position, the light-shielding plate 8a is open to unblock the photo film path 7. Note that light-trap fabric called plush may be attached inside the photo film path 7 instead of the shutter member 8.

Before and after the use of the cassette 2, the photo film 9, inclusive of the leader, is wholly contained inside the cassette 2. The shutter member 8 has a rotational position where the light-shielding plate 8a blocks the photo film path 7. The ambient light is prevented from entering the cassette 2 through the photo film path 7, in adequate fashion similar to a conventional construction with light-trap fabric. When the shutter member 8 is opened in the photo film path 7 and the spool core 4 is rotated in the clockwise direction, a leading end of the photo film 9 is separated by the separator claw 1 from the roll of the photo film. The photo film 9 is advanced to the outside of the photo film path 7 while spreading the ring-like lip 11 of the disks 6a and 6b.

Figure 4:
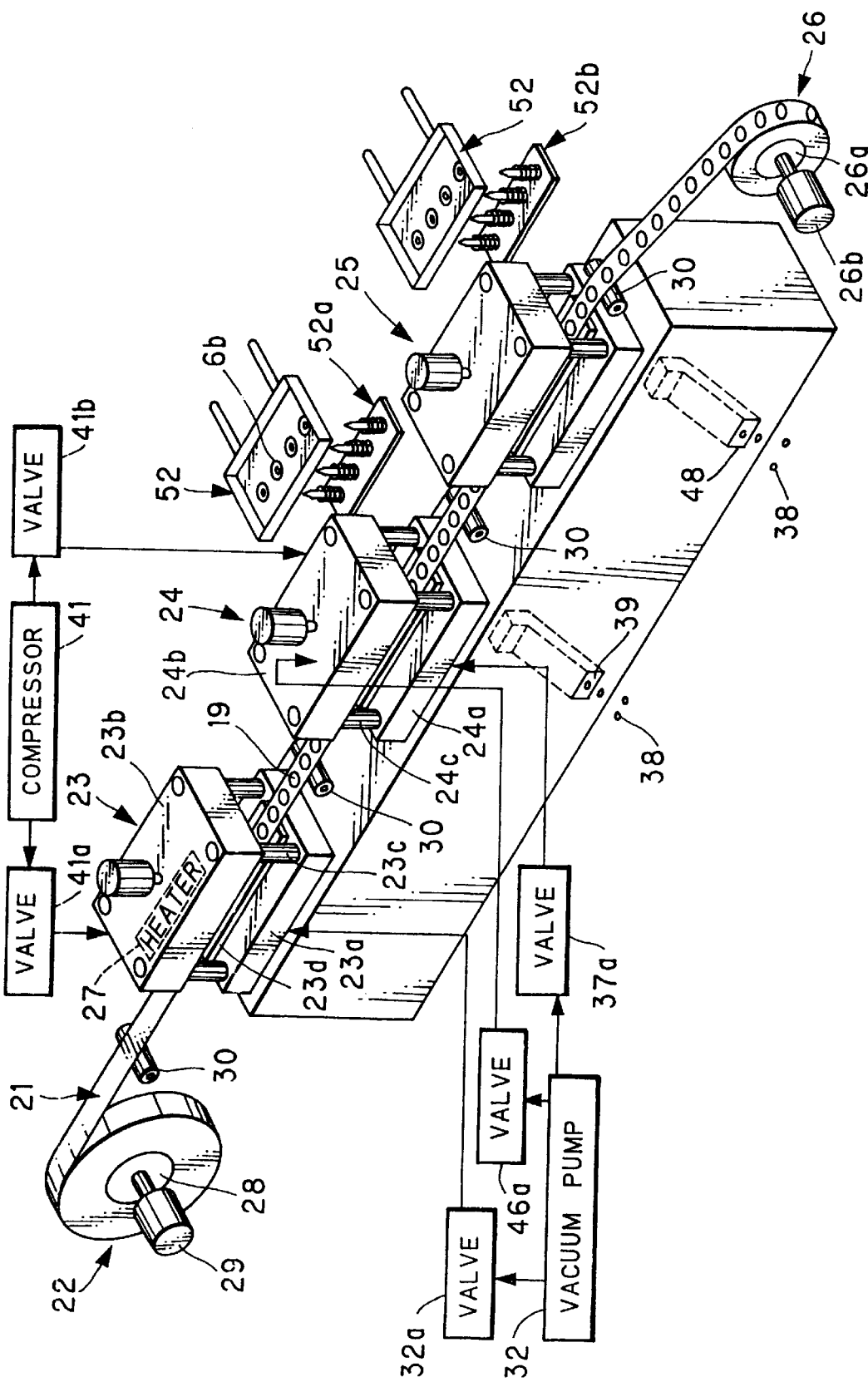
FIG. 4 is an explanatory view in perspective, illustrating a general arrangement of a disk producing apparatus.

FIG. 4 illustrates an apparatus for producing the disk 6b. The disk producing apparatus 20 includes a sheet supply device 22, a vacuum forming unit 23, a first punching unit 24, a second punching unit 25 and a sheet winding device 26. The sheet supply device 22 supplies continuous sheet 21 of thermoplastic resin as material for the disk 6b. The vacuum forming unit 23 applies heat to the continuous sheet 21 from the sheet supply device 22, and forms plural disk-like portions 19 and positioning portions 31 on the continuous sheet 21. Each of the punching units 24 and 25 cuts the contour of the disk 6b and the bearing hole 5 at the disk-like portions 19. The sheet winding device 26 draws the continuous sheet 21 from the sheet supply device 22, while winding the continuous sheet 21 subsequent to the punching of the disk 6b.

The continuous sheet 21 is formed of resin of polystyrene-modified polyphenylene ether with elastomer added thereto. The ratio of polystyrene and polyphenylene ether is 3:7. The proportion of elastomer is 12 wt. %. Note that silicone or antistatic agent may be added as desired. Alternatively polycarbonate film or polyethylene film may be used. The continuous sheet 21 is 0.15 mm thick. The width W of the continuous sheet 21 is 40 mm (See FIG. 6).

The sheet supply device 22 is constituted by a drum 28 with the continuous sheet 21 wound thereabout, and a brake mechanism 29 for applying load to the drum 28 to apply tension to the continuous sheet 21 while pulled by the sheet winding device 26. The sheet winding device 26 is constituted by a drum 26a for winding the continuous sheet 21 as used, and a motor 26b for rotating the drum 26a. Guide rollers 30 are disposed between the sheet supply device 22, the vacuum forming unit 23, the first punching unit 24, the second punching unit 25 and the sheet winding device 26, to guide the continuous sheet 21.

The vacuum forming unit 23 is constituted by a stationary support 23a and a movable support 23b movable vertically along guide shafts 23c toward, and away from, the stationary support 23a. The stationary support 23a includes a female mold 23d disposed to form the disk-like portions 19 and positioning portions 31, and operates for air suction to fit the continuous sheet 21 on the mold 23d tightly. The movable support 23b includes a heating plate for heating and softening the continuous sheet 21. The heating plate has a plurality of small holes, through which the continuous sheet 21 while heated is sucked to the heating plate, and through which the continuous sheet 21 is pressurized with air from a compressor 41 via a valve 41a, to fit the continuous sheet 21 to the mold 23d.

The movable support 23b is driven by a cam, a hydraulic cylinder, or the like. Heaters 27 are incorporated in the stationary support 23a, the movable support 23b and the periphery of the mold, and control the forming of the continuous sheet 21, which is heated, softened, and cooled. Note that the vacuum forming unit 23 operates both for the heating/softening and for the vacuum forming of the continuous sheet 21. Alternatively it is possible to effect those two steps in two successive stations separately. The vacuum forming can be effected only with either one of the air suction and the air pressurization. For the purpose of heightened precision of the forming, both of the air suction and the air pressurization should be effected. The heaters 27 for the stationary support 23a, the movable support 23b and the mold may be electric heaters, oil heaters, or the like.

Figure 5A:
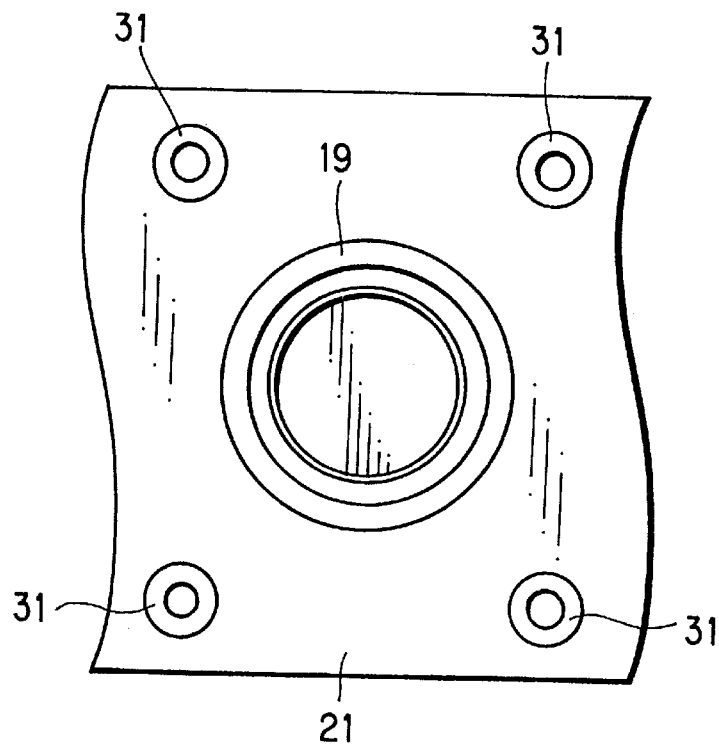
FIGS. 5A and 5B are explanatory views respectively in plan and in cross section, illustrating continuous sheet with a disk-like portion and positioning portions.
Figure 5B:
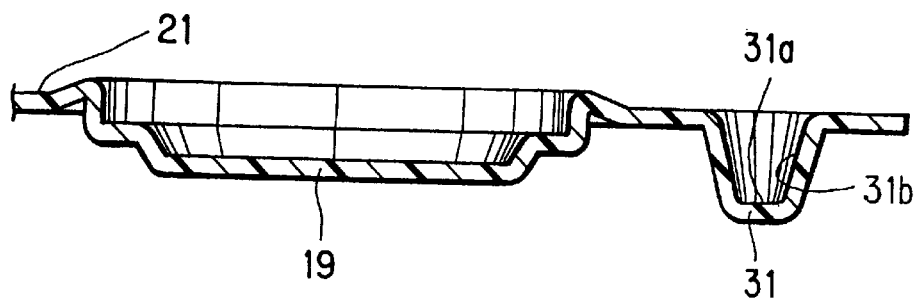

As illustrated in FIGS. 5A and 5B, the continuous sheet 21 moved past the vacuum forming unit 23 has the disk-like portions 19 and the positioning portion 31 arranged thereabout. The positioning portion 31 is shaped as a frustum of a cone, and has an inclined face 31b inclined toward a bottom 31a, which shaped by the suction and is nearly flat. The angle of inclination of the inclined face 31b is 20 degrees with reference to a line perpendicular to the continuous sheet 21. As illustrated in FIG. 6, eight disk-like portions 19 are formable at one time by the vacuum forming unit 23. An interval L1 between adjacent two of the disk-like portions 19 is 25 mm.

Figure 7:
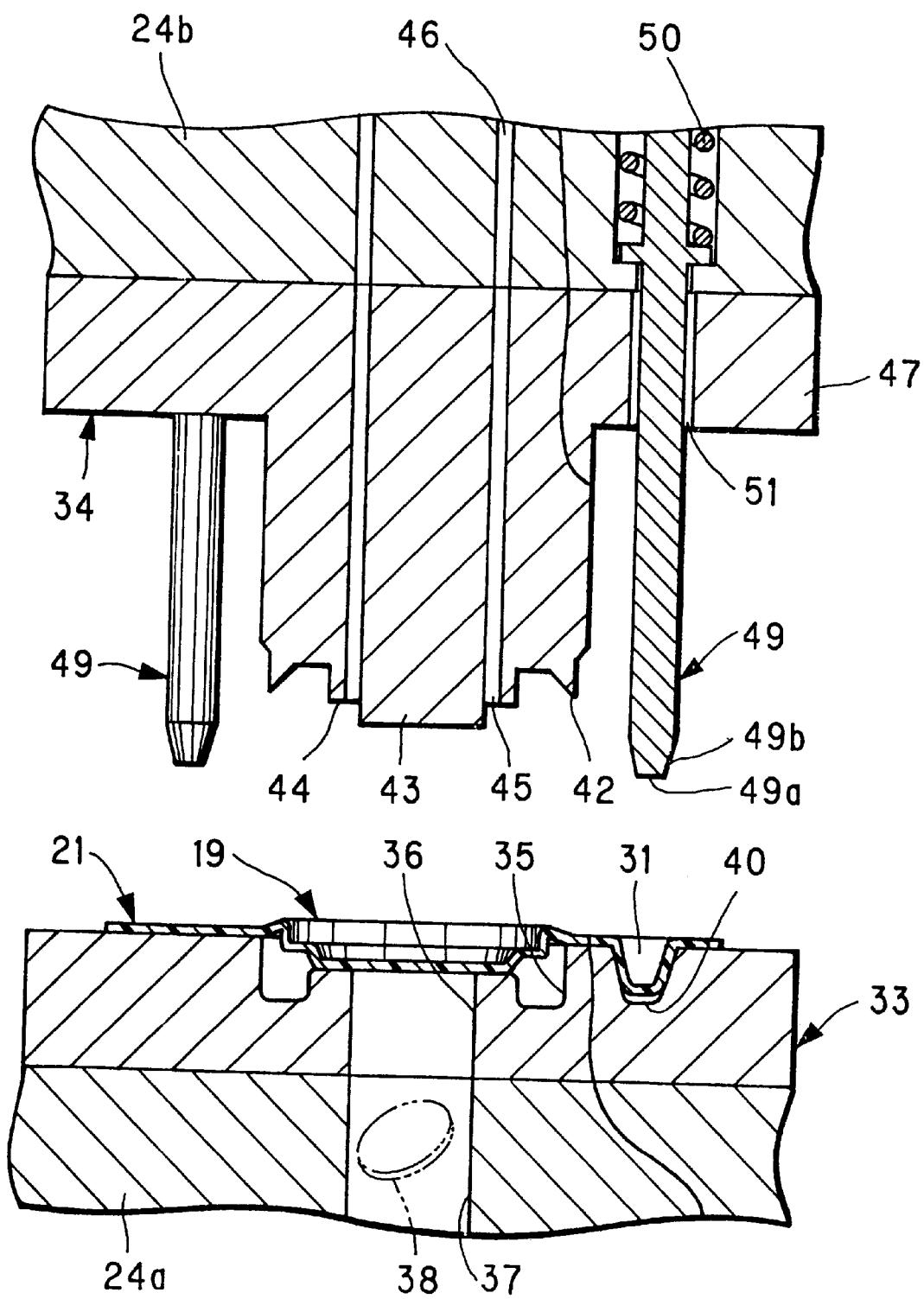
FIG. 7 is a cross section illustrating a first punching unit while the continuous sheet is being set.

As illustrated in FIGS. 4 and 7, the first punching unit 24 has a stationary support 24a and a movable support 24b movable vertically along guide shafts 24c toward, and away from, the stationary support 24a. A die device 33 is secured to the stationary support 24a. A punch device 34 is secured to the movable support 24b. The movable support 24b is driven by a cam, a hydraulic cylinder, or the like. The die device 33 includes an outer die portion 35 for the contour of the disk 6b and an inner die portion 36 for the bearing hole 5. A gap defined in the inner die portion 36 comes through the die device 33. The inside face of the inner die portion 36 communicates with an exit path 37, which is formed in the stationary support 24a. A vacuum pump 32 is connected to the exit path 37 via a valve 37a, and adapted to suction and ejection of a scrap portion 38 created by forming the bearing hole 5 in the disk-like portions 19. The exit path 37 is connected to an outlet 39 formed in a side of the disk producing apparatus 20. The scrap portion 38 is let out through the outlet 39 to the outside. There is a receiving recess 40 formed in the die device 33 for receiving the positioning portion 31.

Figure 8:
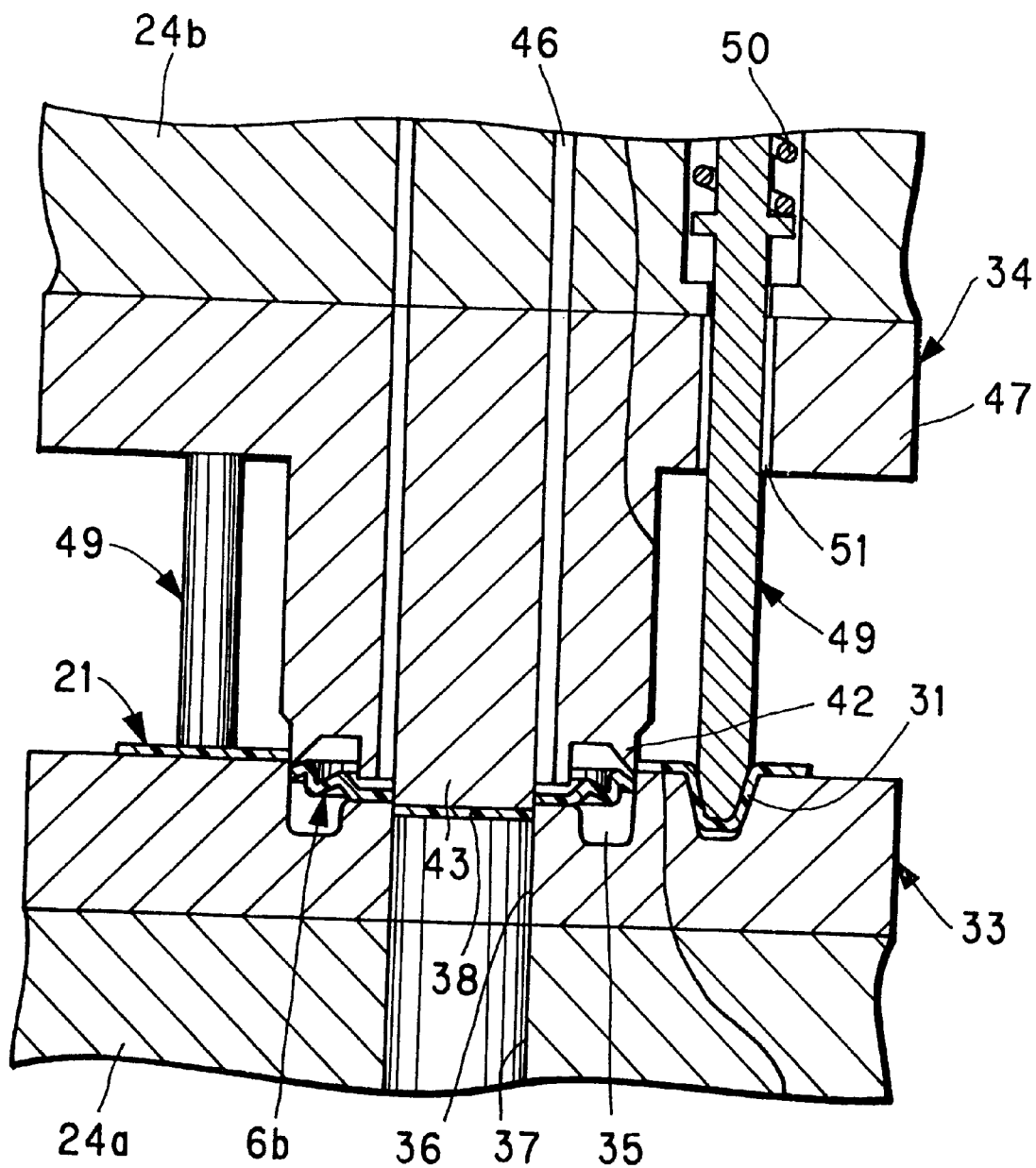
FIG. 8 is a cross section illustrating the first punching unit during the punching operation.
Figure 9:
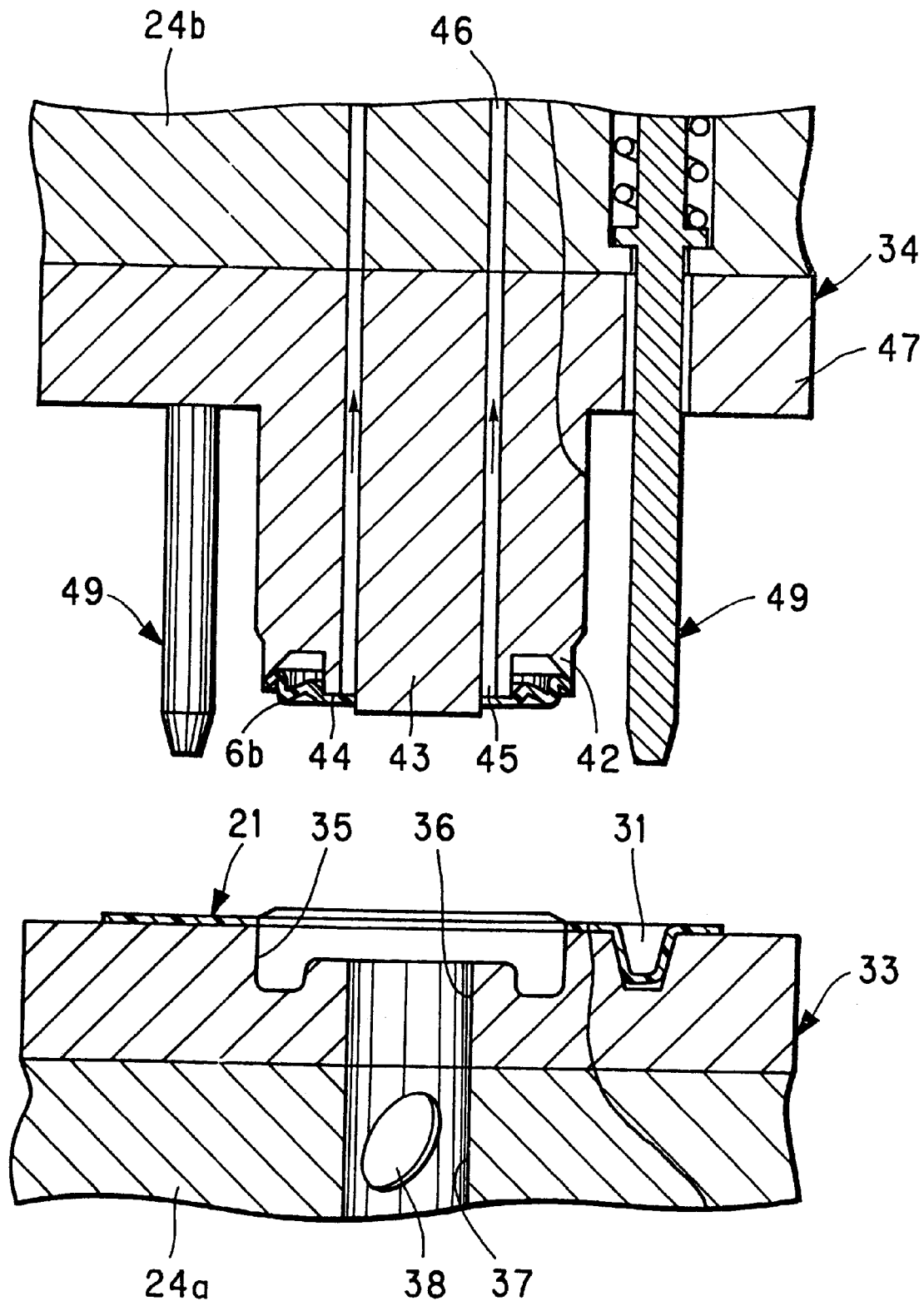
FIG. 9 is a cross section illustrating the first punching unit during the separation of the disk from the continuous sheet.

The punch device 34 includes an outer punch portion 42 and an inner punch portion 43. The outer punch portion 42 is adapted to forming a contour of the disk 6b. The inner punch portion 43 is adapted to forming the bearing hole 5. When the movable support 24b is lowered for the punching, the outer die portion 35 and the inner die portion 36 cut the disk-like portions 19 out of the continuous sheet 21 into the disk 6b as illustrated in FIG. 8. A disk suction face 44 is defined between the outer punch portion 42 and the inner punch portion 43 for applying suction to the disk 6b. There is formed an air path 45 through the punch device 34. The air path 45 is connected to another air path 46 formed through the movable support 24b. The air path 46 is connected to the vacuum pump 32 via a valve 46a. In FIG. 9, the disk 6b after the punching is sucked and held on the disk suction face 44. With the movable support 24b raised, the disk 6b is separated from the continuous sheet 21 without fail.

To withdraw the disk 6b in the completed form from the first punching unit 24, a removing tray 52 in FIG. 4 is used. When the movable support 24b is raised with the disk 6b sucked on the punch device 34, the removing tray 52 is moved to the space between the stationary support 24a and the movable support 24b by an air cylinder or the like, as illustrated in FIG. 10. The valve 46a is closed while a valve 41b at the compressor 41 is opened, so that the air path 45 is changed over from the air suction to the air blow-off. The disk 6b kept on the disk suction face 44 is blown away and down to the removing tray 52. The removing tray 52 is then moved aside the first punching unit 24 illustrated in FIG. 4. The disk 6b is collectively placed in the container, and transferred to an assembling line for the spool core 4. Rods of holders 52a and 52b are inserted into the bearing hole 5 of the disk 6b, and are favorable in facility in the handling.

Figure 11:
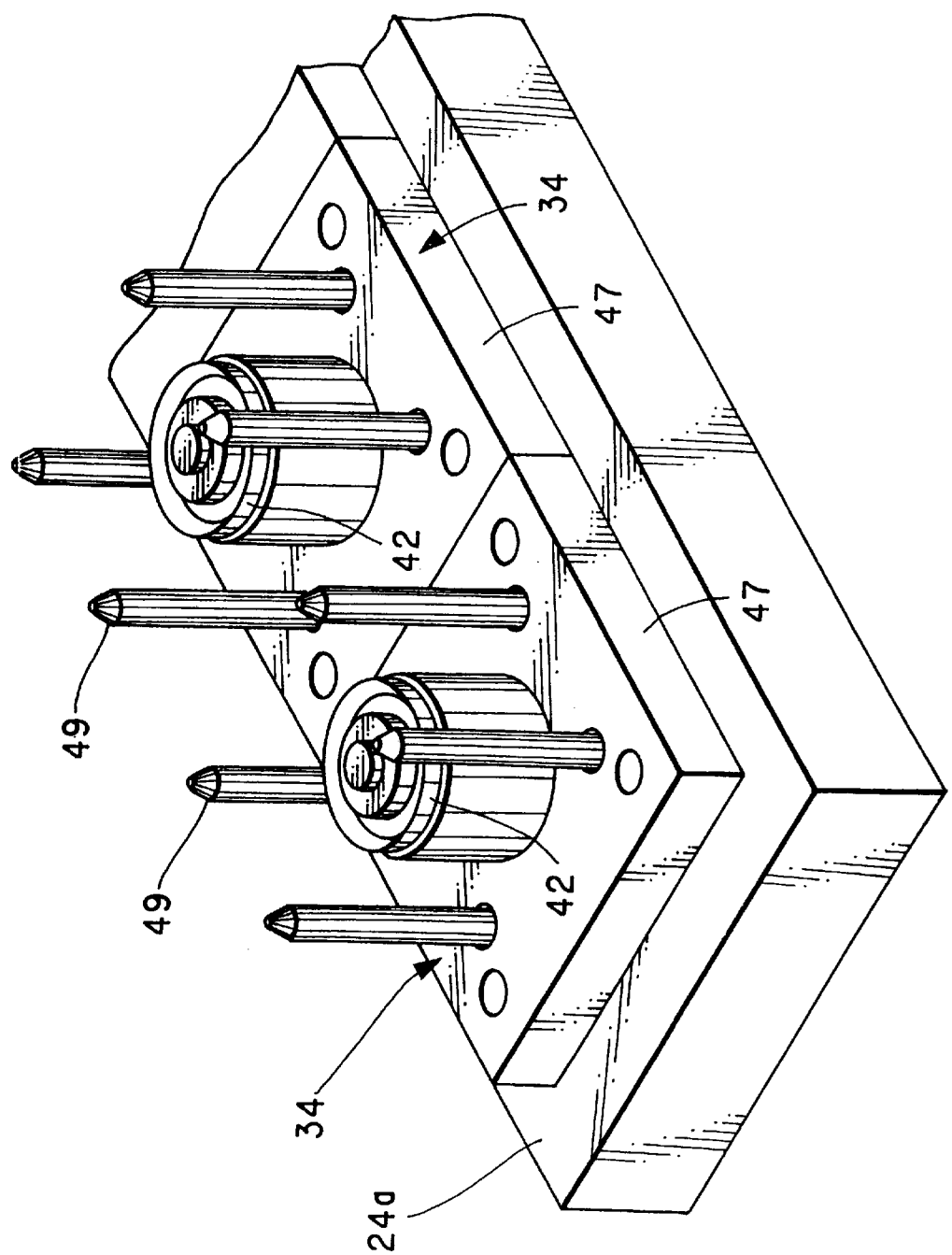
FIG. 11 is a perspective view illustrating the securing of punch devices to a movable support.

A base of the punch device 34 is a plate 47 secured to the movable support 24b. As illustrated in FIG. 11, the plate 47 covers a range of the periphery of the outer punch portion 42, and shaped as a regular quadrangle with each side 50 mm long. Four corners of the plate 47 are fixed on the movable support 24b by means of bolts. This makes it easy to renew the outer punch portion 42 and/or the inner punch portion 43 when degraded in long use. The plate 47 is sufficiently large, so that little distortion occurs in dimension. Precision in the punching is kept from being lowered.

As illustrated in FIG. 7, regulating pins 49 are disposed on the movable support 24b to be received in the positioning portions 31 for the positioning of the continuous sheet 21 before cutting of the disk-like portions 19. The regulating pins 49 are biased by a spring 50 in the downward direction, and come through a hole 51, and has a bottom end 49a located lower than the inner punch portion 43. When the stationary support 24a is lowered, the regulating pins 49 contact the continuous sheet 21 earlier than the outer punch portion 42 or the inner punch portion 43 as illustrated in FIG. 8, and come into the positioning portions 31 to position the continuous sheet 21. When the outer punch portion 42 and the inner punch portion 43 come to the outer die portion 35 and the inner die portion 36, the spring 50 is compressed, while the regulating pins 49 are retracted into the movable support 24b.

The bottom end 49a of the regulating pins 49 has a plane surface. Even if the bottom 31a of the positioning portions 31 has low precision in the forming, the bottom end 49a of the regulating pins 49 is kept from contact with the bottom 31a of the positioning portions 31. The periphery of the bottom end 49a of the regulating pins 49 has an inclined face 49b associated with the inclined face 31b of the positioning portions 31. It is possible in cooperation of the inclined faces 31b and 49b to guide the positioning portions 31 before the continuous sheet 21 is positioned suitably with the positioning portions 31.

The four punch devices 34 are fixed on the movable support 24b. The plate 47 is 50 mm wide. Thus the minimum interval between the punch devices 34 is 50 mm. The four die devices 33 are fixed on the stationary support 24a with bolts. The four disk-like portions 19 are cuttable in the first punching unit 24 at one time. The second punching unit 25 has a construction the same as the first punching unit 24. The disk 6b as cut away is withdrawn through the removing tray 52, and collected on the holder 52b. The scrap portion 38 is exited through an outlet 48.

When the continuous sheet 21 is moved past the vacuum forming unit 23 and to the first punching unit 24, four disk-like portions 19 are cut out of the continuous sheet 21. In FIG. 6, the disk-like portions 19a of a first group are treated in the first punching unit 24. While the pitch of the punch device 34 in series is 50 mm equal to the interval L, a pitch of the disk-like portions 19 in series on the continuous sheet 21 is L1=25 mm. Both of two adjacent disk-like portions cannot be cut out. One of every two adjacent disk-like portions can be cut out, at a cycle of L=50 mm. The continuous sheet 21, having been treated in the first punching unit 24, is moved to the second punching unit 25, where four disk-like portions 19b of a second group is cut out into the disk 6b.

Productivity of various disk forming methods is referred to now. Productivity (%) is defined by the following formula:

$$0.03/B \times 100$$

where 0.03 (in gram) is an average weight of one disk, and B (in gram) is weight of the sheet required to produce one disk. B is obtained as follows:

$$B = A \times 0.015 \times 1.07$$

where A (in cm$^2$) is an area of the sheet required to produce one disk, 0.015 (in cm) is thickness of the sheet, and 1.07 (in grams) is weight of the sheet per 1 cm$^3$.

Six samples are referred to now. In Comparable Example 1 and Samples 1 and 2, plural disks are cut away from the continuous sheet 21. In Comparable Example 2 and Samples 3 and 4, plural disks are cut away from a sheet of a predetermined area. In Comparable Examples 1 and 2, adjacent disks are cut away at one time from the continuous sheet 21. In Samples 1–4, disks are cut away at two times associated with the two groups of the disks. Details of the samples are as follows:

COMPARABLE EXAMPLE 1 (FIG. 18)

Sheet width W1=40 mm;
Disk interval L2=50 mm;
A=20 cm$^2$;
B=0.321 g.

COMPARABLE EXAMPLE 2 (FIG. 19)

Figure 12:
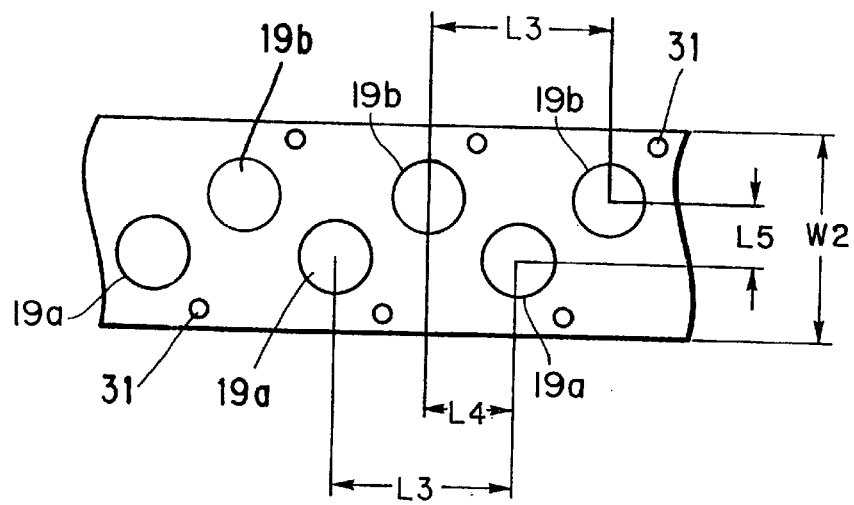
FIGS. 12, 13 and 14 are explanatory views in plan, respectively illustrating other preferred arrangements of disk-like portions on the continuous sheet.
Figure 13:
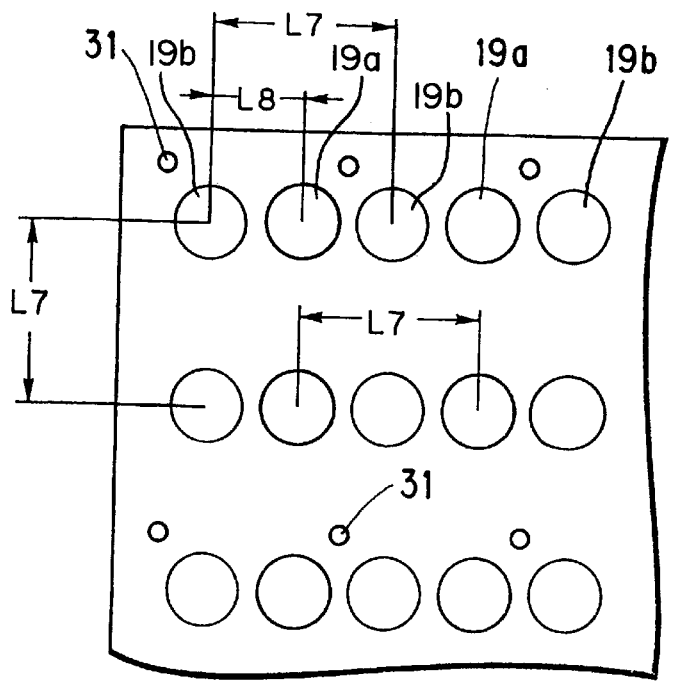

Sheet area C1=900 cm$^2$;
Disk interval L6=50 mm;
36 disks being cut away;
A=21.8 cm$^2$;
B=0.35 g.
Sample 1 (FIG. 6):
 Sheet width W=40 mm;
 Disk interval L=50 mm;
 A=10 cm$^2$;
 B=0.1605 g.
Sample 2 (FIG. 12):
 Sheet width W2=56.6 mm;
 Disk interval L3=50 mm;
 Disk interval L4=25 mm;
 Disk interval L5=17 mm;

A=14.2 cm$^2$;
B=0.227 g.
Sample 3 (FIG. 13):
 Sheet area C2=900 cm$^2$;
 Disk interval L7=50 mm;
 Disk interval L8=25 mm;
 66 disks being cut away;
 A=11.9 cm$^2$;
 B=0.191 g.
Sample 4 (FIG. 14):
 Sheet area C3=900 cm$^2$;
 Disk interval L9=25 mm;
 121 disks being cut away;
 A=6.5 cm$^2$;
 B=0.104 g.

As indicated above, an area and weight of a sheet required for each single disk are considerably smaller in Samples 1–4 than Comparable Examples 1 and 2. A greater number of disks can be produced per a unit length or a unit area of a sheet. Productivity of the six samples are indicated as follows:

Comparable Example 1: 9.3%;

Comparable Example 2: 8.6%;

Sample 1: 18.7%;

Sample 2: 13.2%;

Sample 3: 15.7%;

Sample 4: 28.8%.

This being so, productivity is remarkably greater when disks are cut away at two times associated with the two groups of the disks, than when adjacent disks are cut away at one time from the sheet.

Operation of the above embodiment is referred to now. The continuous sheet 21 wound about the drum 28 in the sheet supply device 22 is drawn by rotation of the sheet winding device 26, guided by the guide rollers 30, supplied to the vacuum forming unit 23, and then stopped from being transported. In the vacuum forming unit 23, the heaters 27 in the stationary support 23a and the movable support 23b are contacted on the continuous sheet 21 being sucked, and heat and soften the continuous sheet 21. The movable support 23b is lowered by the cam or the hydraulic cylinder. The air pressurization is effected through the movable support 23b. The air suction is effected through the stationary support 23a. The continuous sheet 21 is firmly contacted on the mold, to form the eight disk-like portions 19 and the positioning portions 31, as illustrated in FIGS. 5A, 5B and 6. Note that, alternatively, heat may be applied by the blow-off of hot air, or by heat radiation.

After the vacuum forming of the continuous sheet 21, the movable support 23b is raised and detached from the continuous sheet 21. The continuous sheet 21 is again pulled by the sheet winding device 26 and transported, and supplied to the first punching unit 24. The continuous sheet 21 supplied to the first punching unit 24 is once stopped. As illustrated in FIG. 7, the disk-like portions 19a among the eight (See FIG. 6) formed by the vacuum forming unit 23 is provisionally placed in the outer die portion 35 of the die device 33 on the stationary support 24a. The positioning portion 31 is placed in the receiving recess 40.

The movable support 24b is lowered by the cam or the hydraulic cylinder. At first the regulating pins 49 come in contact with the continuous sheet 21. The regulating pins 49 are received in the positioning portions 31. The inclined face 49b guides the inclined face 31b of the positioning portions 31. Even the continuous sheet 21 has deviation, the position of the continuous sheet 21 is regulated reliably, as illustrated in FIG. 8. Further lowering of the movable support 24b causes the regulating pins 49 to retreat into the movable support 24b, against the bias of the spring 50. In a final step of lowering the movable support 24b, the outer punch portion 42 and the inner punch portion 43 come to the continuous sheet 21. The outer punch portion 42 cooperates with the outer die portion 35 while the inner punch portion 43 cooperates with the inner die portion 36. The contour of the disk 6b and the bearing hole 5 are cut.

The disk-like portions 19 and the positioning portions 31 are formed at the same time in the vacuum forming. Even when the continuous sheet 21 has significant distortion, the relationship in position between the disk-like portions 19 and the positioning portions 31 is kept unchanged. The continuous sheet 21 is placed by precisely positioning the positioning portions 31 at the regulating pins 49. There occurs no deviation in position between the forming and the punching. The contour of the disk 6b and the bearing hole 5 are cut at the same time. The bearing hole 5 can be formed without any off-centered fashion. Note that, for the purpose of reducing distortion of the continuous sheet 21, it is effective to form a ring-like groove between the disk-like portions 19 at the depth of 3 mm.

The scrap portion 38 created in forming the bearing hole 5 in the disk 6b is sucked by the vacuum pump 32 via the valve 37a through the inner die portion 36 and the exit path 37. As illustrated in FIG. 4, the scrap portion 38 is exited through the outlet 39 to the outside of the disk producing apparatus 20. The four disks 6b from the continuous sheet 21 are sucked by the vacuum pump 32 through the valve 46a and the air path 45 and 46, and kept in contact with the disk sucking face 44. With the movable support 24b raised away from the continuous sheet 21, the disk 6b is raised with the punch device 34, and is separated from the continuous sheet 21.

When the movable support 24b is raised and stopped, the removing tray 52 is driven by an air cylinder or the like and inserted into a space between the stationary support 24a and the movable support 24b, as illustrated in FIG. 10. A sensor detects the end of inserting movement of the removing tray 52. Immediately the air paths 45 and 46, through which suction has been effected, are changed over to blow-off. The four disks 6b are blown away from the punch device 34, and dropped to the removing tray 52. The removing tray 52 is moved from between the stationary and movable supports 24a and 24b to its home position away from the transport path. The disk 6b is collectively reserved in the holder 52a with the bearing hole 5 placed on a rod. Then the rod with the disks is removed from the holder 52a, contained in a container, and transported to an assembling line for the spool core 4.

The part of the continuous sheet 21 treated by the first punching unit 24 is transported to the second punching unit 25, where the punch device and the die device similar to those of the first punching unit 24 cuts the disk-like portions 19b of the second group in FIG. 6. The scrap portion 38 as created is exited through the outlet 48 as illustrated in FIG. 4. The four disks 6b are withdrawn out of the second punching unit 25 through the removing tray 52. The continuous sheet 21 with cutouts after the punching is wound about the drum 26a of the sheet winding device 26, and recycled by melting and reforming.

Figure 14:
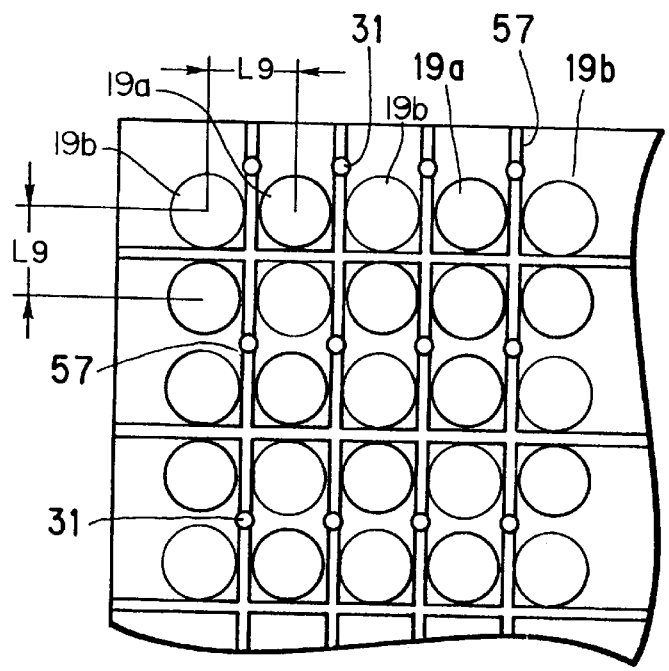

In the above embodiment, Sample 1 is used for forming the disk-like portions 19 on the continuous sheet 21. Instead Sample 2 may be used. Samples 3 and 4 are suitable for forming the disk-like portions 19 on a sheet of a predetermined area. It is also preferable, as illustrated in FIG. 14, to form ridges 57 between the disk-like portions 19 at the height of 3 mm. The ridges 57 are effective in raising flatness of the sheet, and in raising precision in positioning the sheet with the positioning portions 31. In both of the punching units 24 and 25, the contour of the disk 6b and the bearing hole 5 are cut at the same time. Alternatively it is possible that a first punching unit cuts the bearing hole 5 exclusively, and that a second punching unit cuts the contour of the disk 6b exclusively. The scrap portion 38 is ejected through the outlet 39. The disk 6b is ejected through the outlet 48. There is no need of the removing tray 52.

Figure 15:
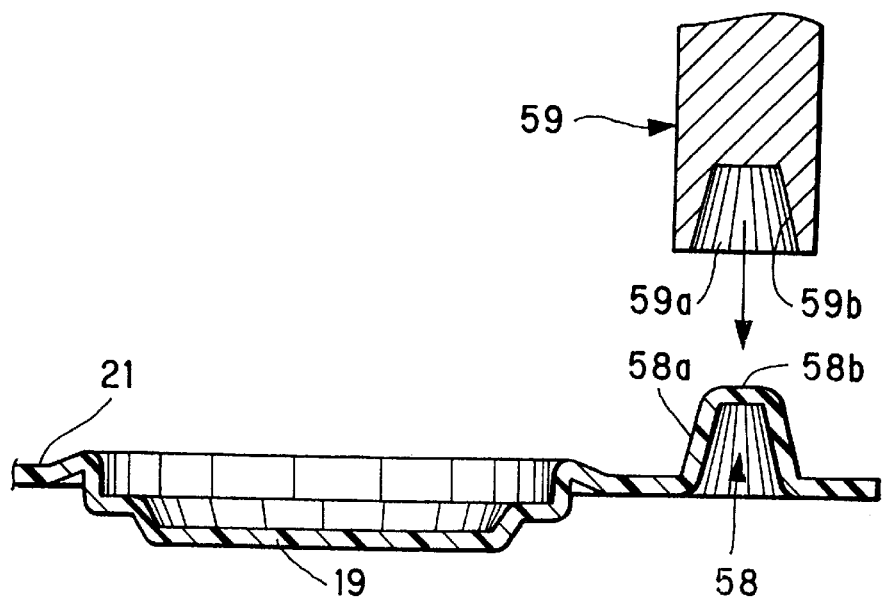
FIG. 15 is an explanatory view in cross section, illustrating another preferred positioning portion on continuous sheet, together with a disk-like portion and a regulating pin.

In positioning the continuous sheet 21, the regulating pins 49 cooperate with the positioning portions 31. Alternatively regulating pins 59 in FIG. 15 may be provided with a recess 59a, which is associated with each of projected positioning portions 58. The positioning portions 58 have an inclined face 58a inclined toward a top 58b. It is possible in cooperation of the inclined face 58a and an inclined face 59b to guide the positioning portions 58 before the continuous sheet 21 is positioned suitably with the positioning portions 58.

Figure 16A:
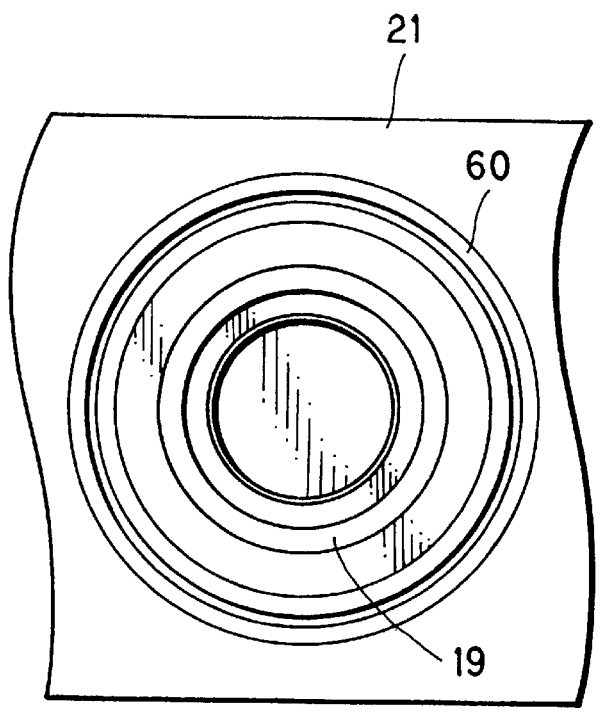
FIGS. 16A and 16B are explanatory views respectively in plan and in cross section, illustrating still other preferred positioning portion on continuous sheet, together with a disk-like portion.
Figure 16B:
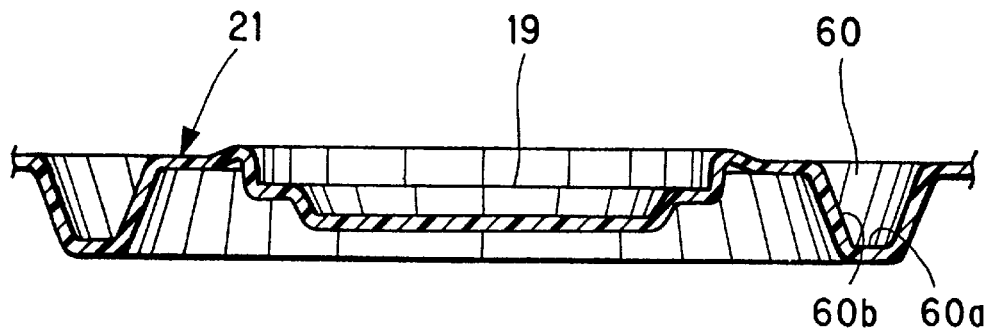
Figure 17:
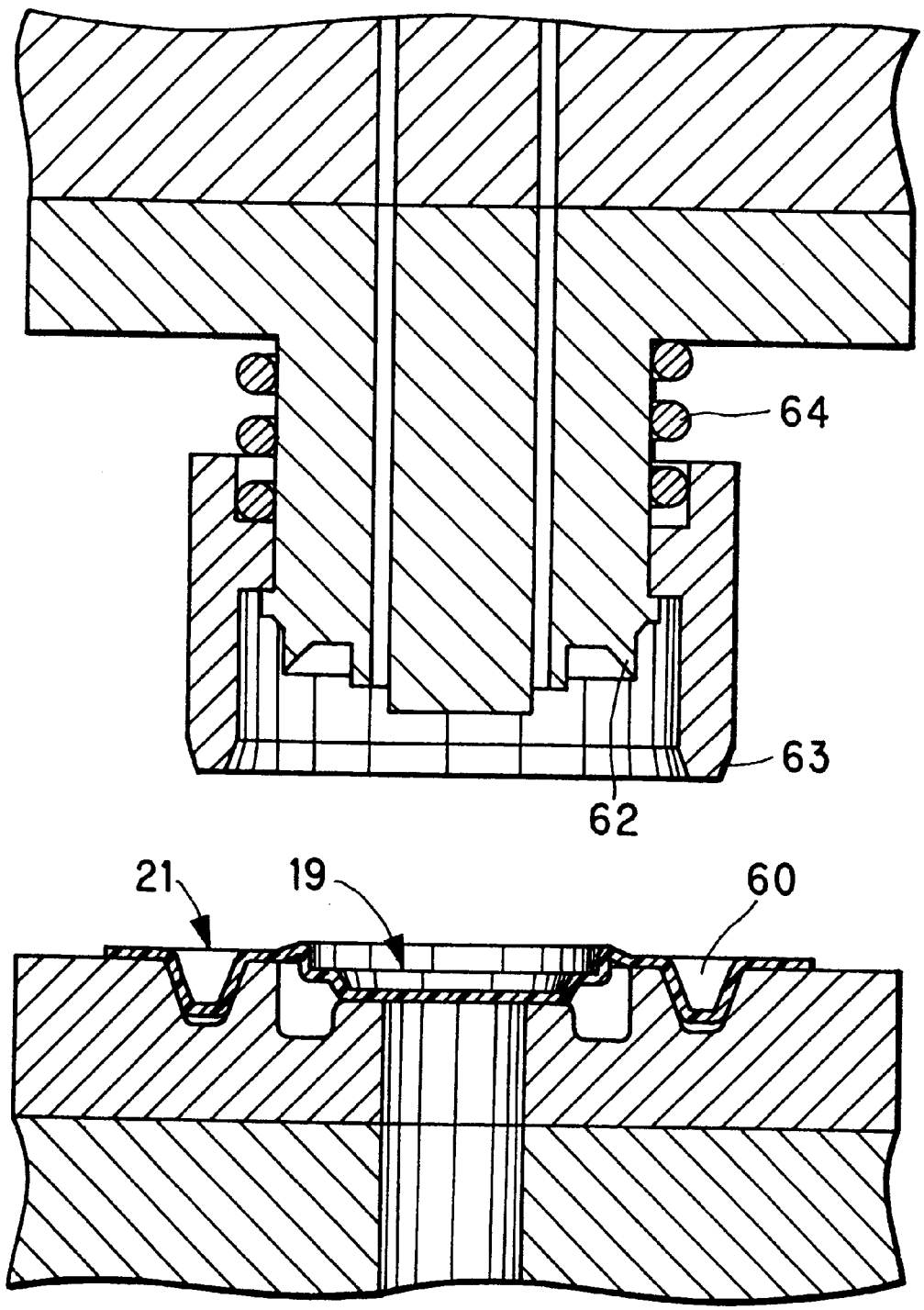
FIG. 17 is a cross section illustrating a variant first punching unit adapted to the punching of the continuous sheet of FIGS. 16A and 16B.
Figure 18:
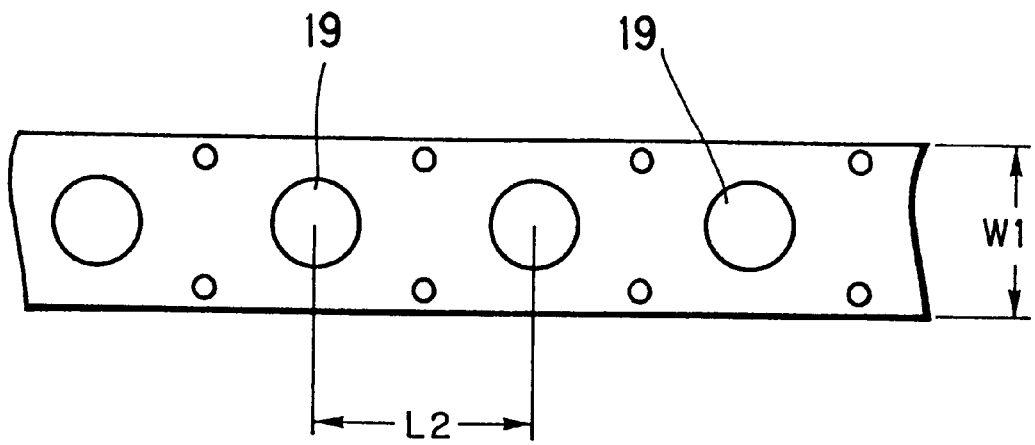
FIGS. 18 and 19 are explanatory views in plan, respectively illustrating arrangements of disk-like portions on continuous sheet in accordance with the prior art.
Figure 19:
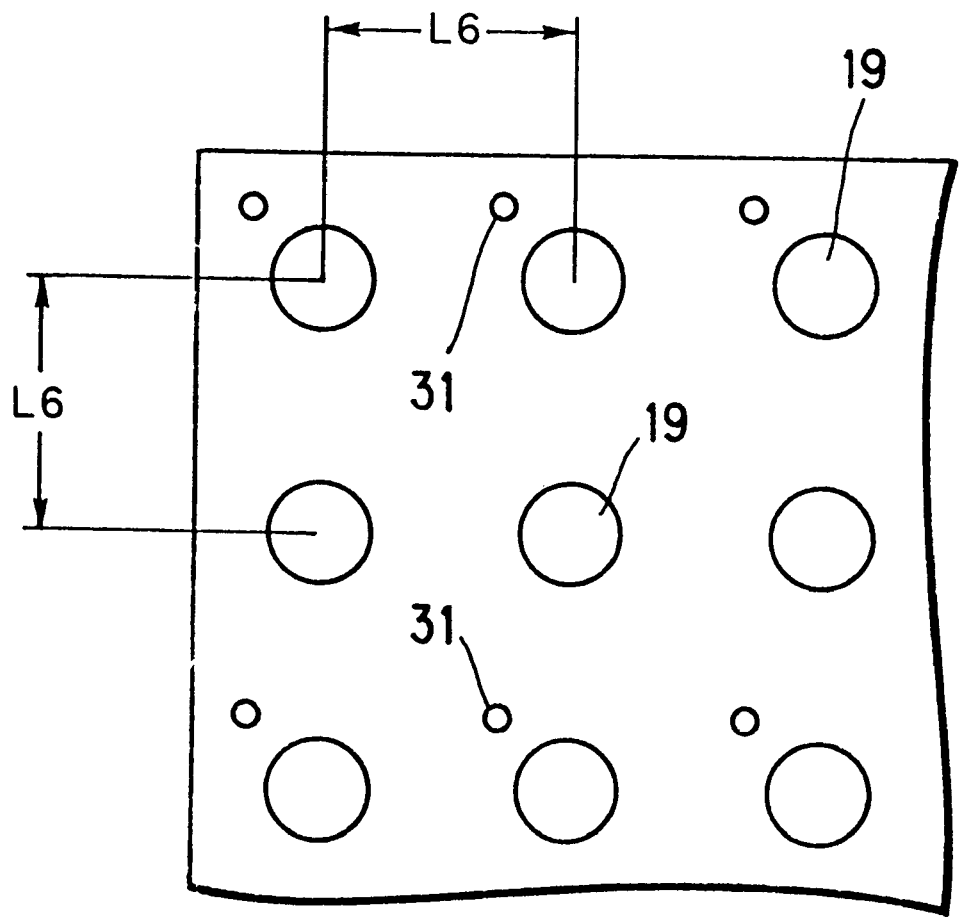

Referring to FIGS. 16A and 16B, the continuous sheet 21 can be provided with ring-like positioning portions 60 around the disk-like portions 19. The positioning portion 60 has a bottom 60a and an inclined face 60b. As regulating device, a regulating ring 63 in FIG. 17 is disposed around a punch device 62. The positioning ring 63 is biased by a spring 64, and received in the positioning portion 60 of the continuous sheet 21. The periphery of the disk-like portions 19 can be held in uniform fashion by the positioning portion 60 and the positioning ring 63. The positioning is precise and reliable. No deviation in position occurs between the forming and the punching.

In the above embodiments, the disk 6b is formed. The present invention is applicable of forming of the disk 6a, with suitable structures of a mold, a punch, and a die. It is also possible that both the disks 6a and 6b are formed in the vacuum forming unit 23, that a first punching unit cuts the disk 6a, and that a second punching unit in turn cuts the disk 6b.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk producing method for a photo film cassette, said photo film cassette including a spool core, on which photo film is wound in a form of a roll;

a cassette shell for containing said spool core in rotatable fashion;

first and second disks, respectively provided with first and second bearing holes formed in a middle thereof, and respectively secured to first and second ends of said spool core, for regulating positions of sides of said roll; and a ring-shaped lip, formed integrally with a periphery of said first disk, projected toward said roll, and contacted on one edge of an outermost turn of said roll, for preventing said roll from being loosened;

said disk producing method comprising steps of:

heating and softening a sheet of thermoplastic resin;

applying pressurization and/or suction to said sheet, which has been heated in said heating step, for fitting said sheet on a mold, so as to form a pattern on said sheet, said pattern including first and second groups of disk-shaped portions and positioning portions associated with said disk-shaped portions;

first cutting said disk-shaped portions of said first group out of said sheet with said pattern while said sheet is positioned by said positioning portions in a first station, to produce a plurality of disks including at least said one first disk; and second cutting said disk-shaped portions of said second group out of said sheet with said pattern while said sheet is positioned by said positioning portions in a second station downstream from said first station, to produce another plurality of disks including at least one said first disk;

wherein said first and second groups of disk-shaped portions are arranged such that one of said disk-shaped portions of said second group is positioned between two adjacent disk-shaped portions of said first group:

wherein in each of said first and second cutting steps, a regulating device accesses said sheet, and is fitted on said positioning portions to position said sheet; and one of the following occurs:

said applying step forms said positioning portions on said sheet in retraction to receive said regulating device and to have an inclined face included toward a bottom of said retraction; or said applying step forms said positioning portions on said sheet in protrusion to be received in said regulating device and to have an inclined face inclined toward a top of said protrusion;

wherein each of said first and second cutting steps includes a step of cutting a contour of said first disk and said first bearing hole in a middle of said disk-shaped portions, with a punch device and a die device; and wherein said contour is cut concentrically with said disk-shaped portions and said sheet is positioned by engaging an inclined face of said regulating device with said inclined face of said positioning portions, said contour and said first bearing hole being cut in said disk-shaped portions before coming out of said regulating device in contact with said bottom of said retraction of said positioning portion, or said top of said protrusion of said positioning portion.

2. A disk producing method as defined in claim 1, wherein a forming station for said pressurization and/or suction to said sheet has a stationary support and a movable support, said mold being disposed on said stationary support; and said sheet receives said pressurization through said movable support, and/or said suction through said stationary support.

3. A disk producing method as defined in claim 1, wherein each of said first and second cutting steps further includes the steps of:

applying suction through a first air path, for exiting scrap portions created in cutting said first bearing hole, said first air path being formed in a middle of said punch device or said die device; and applying suction through a second air path formed in said punch device or said die device, for retaining said first disk on said punch device or said die device, to separate said first disk from said sheet, said first disk being removed from said punch device or said die device.

4. A disk producing method as defined in claim 3, wherein said applying pressurization and/or suction step forms said ring-shaped lip on said sheet by forming said disk-shaped portions; and during said contour cutting step, said punch device is moved toward said die device in a direction opposite to a direction of protrusion of said ring-shaped lip from said sheet, to cut said disk-shaped portions.

5. A disk producing method as defined in claim 3 wherein said step of applying suction through said second air path includes a step of moving said punch device or said die device on which said first disk is retained to lift said first disk away from said sheet.

6. A disk producing method as defined in claim 5, further comprising a step of discontinuing said suction being applied through said second air path to enable said first disk to separate from said punch device or said die device on which said first disk is being retained.

7. A disk producing method for a photo film cassette, said photo film cassette including a spool core, on which photo film is wound in a form of a roll;

- a cassette shell for containing said spool core in rotatable fashion;
- first and second disks, respectively provided with first and second bearing holes formed in a middle thereof, and respectively secured to first and second ends of said spool core, for regulating positions of sides of said roll; and
- a ring-shaped lip, formed integrally with a periphery of said first disk, projected toward said roll, and contacted on one edge of an outermost turn of said roll, for preventing said roll from being loosened;

said disk producing method comprising steps of:

heating and softening a sheet of thermoplastic resin;

applying pressurization and/or suction to said sheet, which has been heated in said heating step, for fitting said sheet on a mold, so as to form a pattern on said sheet, said pattern including first and second groups of disk-shaped portions and positioning portions associated with said disk-shaped portions;

first cutting said disk-shaped portions of said first group out of said sheet with said pattern while said sheet is positioned by said positioning portions in a first station, to produce a plurality of disks including at least said one first disk; and second cutting said disk-shaped portions of said second group out of said sheet with said pattern while said sheet is positioned by said positioning portions in a second station downstream from said first station, to produce another plurality of disks including at least one said first disk;

wherein said first and second groups of disk-shaped portions are arranged such that one of said disk-shared portions of said second group is positioned between two adjacent disk-shaped portions of said first group;

wherein each of said first and second cutting steps includes the steps of;

- cutting a contour of said first disk and said first bearing hole in a middle of said disk-shaped portions, with a punch device and a die device;
- applying suction through a first air path, for exiting scrap portions created in cutting said first bearing hole, said first air path being formed in a middle of said punch device or said die device; and
- applying suction through a second air path form in said punch device or said die device, for retaining said first disk on said punch device or said die device, to separate said first disk from said sheet, said first disk being removed from said punch device or said die device.

8. A disk producing method as defined in claim 7, wherein said applying pressurization and/or suction step forms said ring-shaped lip on said sheet by forming said disk-shaped portions; and during said contour cutting step, said punch device is moved toward said die device in a direction opposite to a direction of protrusion of said ring-shaped lip from said sheet, to cut said disk-shaped portions.

* * * * *